United States Patent [19]
Cimenti

[11] Patent Number: 5,862,743
[45] Date of Patent: Jan. 26, 1999

[54] APPORTIONING DEVICE FOR DOUGH

[76] Inventor: Antonio Cimenti, Localita Fontane, 3-Polcenigo, Pordenone, Italy

[21] Appl. No.: 986,576

[22] Filed: Dec. 5, 1997

[30] Foreign Application Priority Data

Jan. 2, 1997 [IT] Italy .............................. PN97 A 0001

[51] Int. Cl.$^6$ .............................. A21C 3/02; A21C 3/06; A21C 11/00; A23P 1/00
[52] U.S. Cl. ......................... 99/450.2; 99/353; 99/450.1; 99/537; 425/321; 425/337; 425/367
[58] Field of Search ................................ 99/450.1, 450.2, 99/450.6, 450.7, 450.3, 352, 353, 537; 100/118, 151, 153; 264/281, 285; 425/322, 319–321, 329, 334, 335, 337, 340, 341, 357, 391, 400, 372, 397, 367, 371, 364 R; 426/500–502, 392, 512

[56] References Cited

U.S. PATENT DOCUMENTS

| | | | |
|---|---|---|---|
| 3,704,664 | 12/1972 | Fisher, Jr. ............................... | 99/450.2 |
| 4,043,259 | 8/1977 | Sato .......................................... | 99/353 |
| 4,171,197 | 10/1979 | Sato ........................................ | 425/321 |
| 4,403,937 | 9/1983 | Zamparelli et al. ...................... | 425/337 |
| 4,636,164 | 1/1987 | Bellotto et al. .......................... | 425/337 |
| 4,637,304 | 1/1987 | Suzuki .................................... | 99/450.2 |
| 4,741,263 | 5/1988 | Ueno et al. .......................... | 99/450.1 X |
| 4,767,638 | 8/1988 | Uhrovic ................................ | 426/500 |
| 4,971,546 | 11/1990 | Cimenti .................................. | 425/337 |
| 4,996,915 | 3/1991 | Morikawa et al. ..................... | 99/450.2 |
| 5,257,573 | 11/1993 | Kimura et al. ......................... | 99/450.2 |
| 5,382,154 | 1/1995 | Morikawa et al. ..................... | 425/321 |
| 5,440,974 | 8/1995 | Ueno et al. ............................ | 99/450.2 |

*Primary Examiner*—Timothy F. Simone
*Attorney, Agent, or Firm*—Wenderoth, Lind & Ponack, L.L.P.

[57] ABSTRACT

A food dough apportioning device including a housing, a feeder unit (4), a cutting device (8), and a discharge unit (9). The feeder unit has a plurality of support elements which project from a front surface of the housing. The feeder unit and dispensing unit include rollers for driving conveyor belts, respectively. An adjustment unit (90) is provided for adjusting the tension of the discharge conveyor belt (91). Also, a number of rotatable shafts are keyed to rollers of a roller train. One of the shafts is arranged approximately centrally to the other shafts of the rolling train, the cutting device, and the device for moving the conveyor belt of the feeder unit. The centrally located shaft is attached by clamping the shaft between the front surface of the housing shaft and a disk by screwing on a knob on an outer end of the shaft. The disk partially covers the shafts and detains all of the rollers, as well as the cutting device.

12 Claims, 7 Drawing Sheets

APPORTIONING DEVICE FOR DOUGH

BACKGROUND OF THE INVENTION

The present invention is directed to a dough apportioning apparatus having overall dimensions so as to be usable especially on counter tops, tables, and the like. The apportioning apparatus is constructed so as to be capable of being completely disassembled. In particular, the apportioning apparatus of the present invention is capable of being completely disassembled and all of the parts which come into contact with the dough during processing are accessible, thus permitting simple and quick cleaning of all of such parts.

In the prior art, special machines commonly called apportioners are used to subdivide a large rolled piece of dough into parts of reduced size. The known apportioners are essentially of various types, for example extrusion, rolling, and volumetric apportioners.

In such machines, and particularly in those of extrusion, the dough undergoes an alteration of the glutinous structure which thereupon gives rise to disadvantages in subsequent usage phases. In roller and volumetric machines there are components which enter into contact with the dough to be processed. The components are, for the most part, effectively inaccessible, and therefore it is very difficult to perform a complete hygienic cleaning operation which requires difficult and complex disassembly and reassembly of the entire unit.

SUMMARY OF THE INVENTION

An object of the present invention is to provide an apportioning device which overcomes the disadvantages associated with the known machines. The fundamental purpose of the apportioning apparatus of the present invention is to be able to quickly and easily remove and install all components which come into contact with the dough. Such an apportioning apparatus would permit complete maintenance, inspection, and cleaning. Accordingly, an object of the present invention is to make it possible to obtain a degree of hygiene which is not obtainable in similar machines, thus also making the apportioning machine more economical.

BRIEF DESCRIPTION OF THE DRAWINGS

In order to better understand the features and advantages which are obtainable with an apportioning apparatus in accordance with the present invention, a preferred embodiment will be described below, by way of a non-limiting example with reference to the drawings figures, of which.

DETAILED DESCRIPTION OF THE INVENTION

Figure 1:
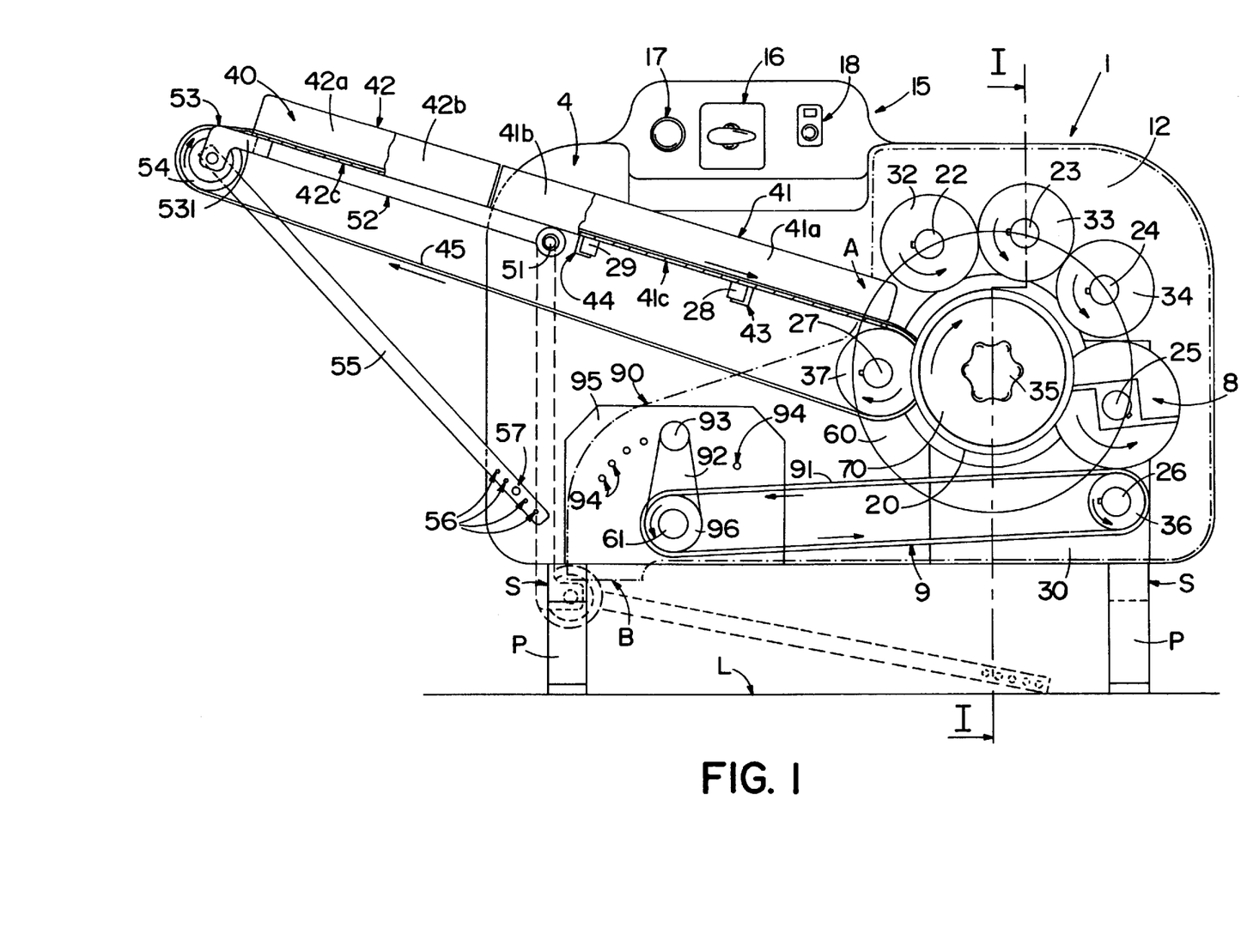
FIG. 1 shows a front view of an apportioning apparatus constructed in accordance with the present invention.
Figure 2:
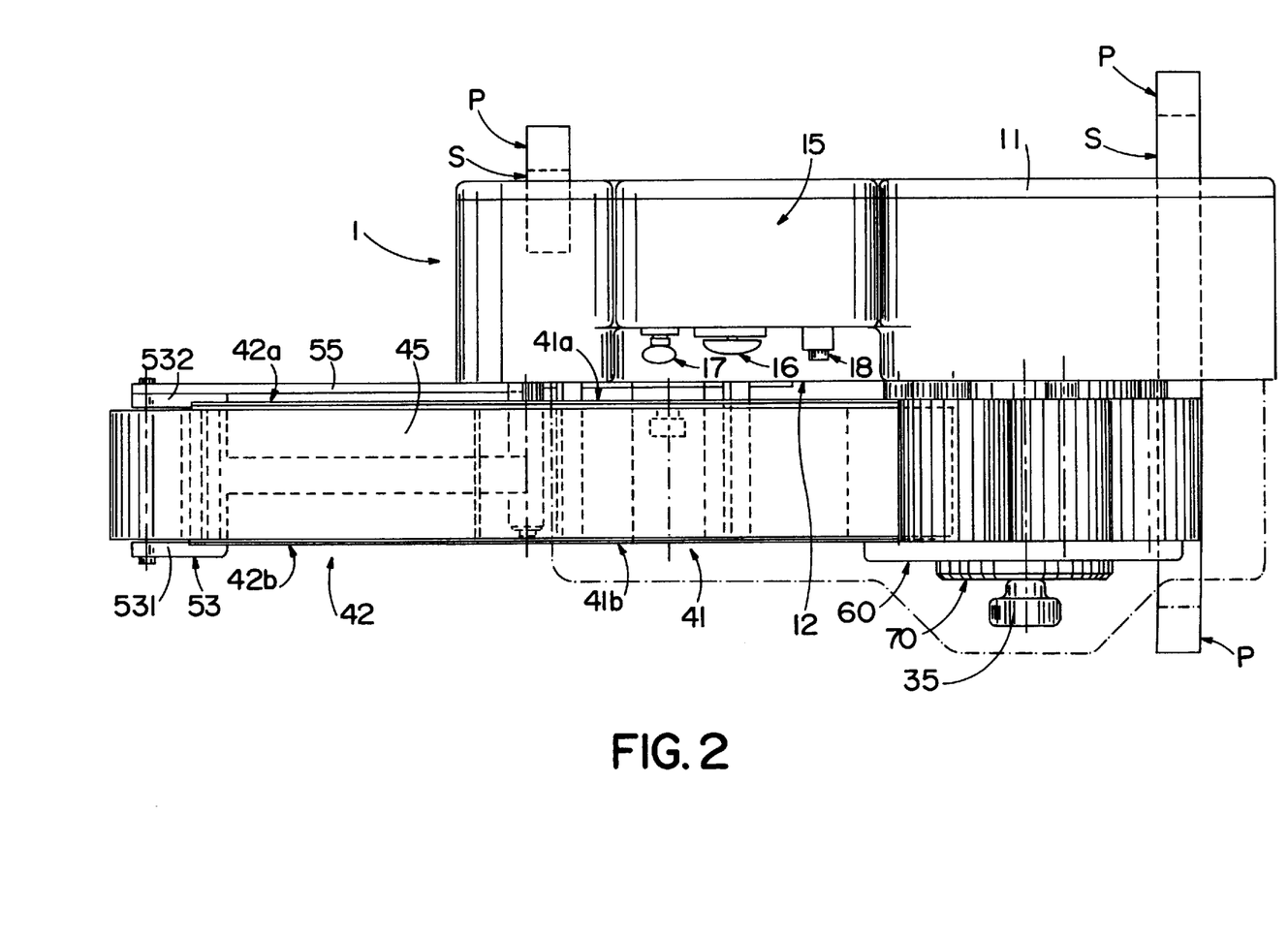
FIG. 2 is a plan view of the apparatus shown in FIG. 1.

With reference to the above-mentioned figures and in particular to FIGS. 1–2, the dough apportioning apparatus includes a housing 1 having an essentially parallelopiped shape. Motors and gearing for the actuation of the conveying, rolling, and cutting elements are provided in the housing 1. At an upper portion of the housing a projecting part 15 is formed, and on a front surface of the projecting part, switches or devices for control (16), adjustment (18), and safety (17) are arranged. The housing is closed on one side by a removable cover 11 which can be removed to permit access to the internal components of the apportioning apparatus.

Figure 3:
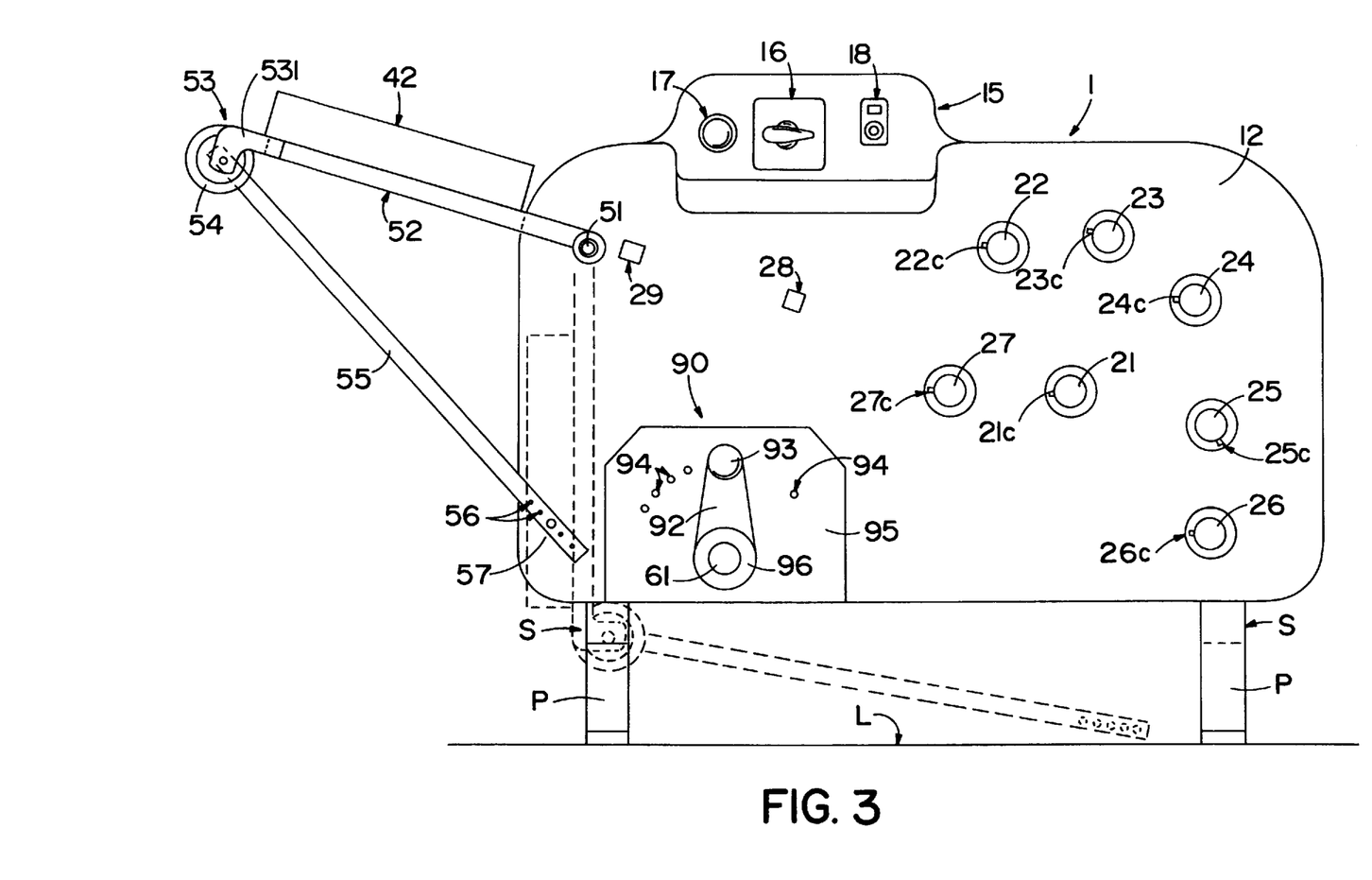
FIG. 3 shows a front view of the apportioning apparatus of FIG. 1 with components removed.

On an opposite side of the housing, as best shown in FIG. 3, a plurality of shafts 21, 22, 23, 24, 25, 26, and 27 project from a flat or planar front surface 12 of the housing. Also, two supporting elements 28 and 29 project from surface 12 for supporting an interior section 41 of a feeder conduit 40 (see FIGS. 1, 2, 4, and 5). A hinge member 51 on which is hinged an internal end of a pivotable arm 52 which carries an outside or exterior section 42 of feeder conduit 40. The arm 52 terminates at its opposite free exterior end with a fork 53 having side arms 531 and 532 from which is hinged an idler roller 54 as well as an end of an adjustment rod 55 which is hinged on the inside side arm 532. Finally, a device 90 for supporting and adjusting the tension of conveyor belt 91 of the discharge unit 9 is connected to an eccentric hinge 61 which projects from flat surface 12.

The housing 1 will obviously be provided at its lower section with a support structure S provided with suitable legs P for supporting the housing on a suitable work bench surface L.

The shafts 21, 22, 23, 24, 25, 26, and 27 are all rotatably driven by suitable related means of actuation disposed in the housing 1 which will be described below. Each of the shafts are equipped with related keys 21c, 22c, 23c, 24c, 25c, 26c, and 27c. The keys are suitable for attaching and transmitting rotation to roller elements 31, 32, 33, 34, 8, 36, and 37, respectively.

As illustrated in FIGS. 2, 3, 4 or 5, the shafts 21, 22, 23, 24, 25, 26, and 27 are arranged on the right hand side of the housing wall forming the flat surface 12. More precisely, the shaft 21 is arranged approximately at the center of the right half of the flat surface 12 and on the upper part of this surface three shafts 22–24 are arranged radially at progressively decreasing distances from the central axis of shaft 21. Also, the three shafts 22–24 are equidistant from the outer diameters of rollers 32, 33, 34 which are applied to the shafts, respectively.

The shaft 25 is disposed below shaft 24 and roller 34. The shaft 25 is also spaced radially outwardly of shaft 21. A cutting device is mounted on shaft 25 which is designed to control rotation of the related cutting device 8. The shaft 26 is disposed in a lower portion of the housing 1 approximately vertically below shaft 25. The shaft 26 controls discharge unit 9 as described below. A support and adjustment device 90 for supporting and adjusting the discharge unit conveyor belt 91 is provided in proximity to the lower portion of the housing 1 at a suitable distance from the left side of the housing 1. The support and adjustment device 90, as is clearly evident in FIGS. 1, 3, 4, and 5, includes a crank 92 hinged on an eccentric hinge 61. A manually rotatable knob 93 is provided on a free end of crank 92 for rotating the crank around the eccentric hinge 61 as well as moving a little peg (not shown) which is coaxial with respect to the knob. The peg can be inserted in or extracted from a plurality of holes 94 which are radially disposed, relative to the axis of rotation of the crank 92, on a suitable plate 95 attached onto a corresponding part of flat surface 12. An idler roller 96 is attached to the eccentric hinge 61. The idler roller 96 is suitable for supporting one end of the discharge device conveyor belt 91. Finally, a shaft 27 for driving the feeder unit 4 is also arranged radially of the shaft 21 as well as at a suitable distance from the shaft 21 on a surface of the housing which is opposite to the location of shafts 25 and 26.

Figure 4:
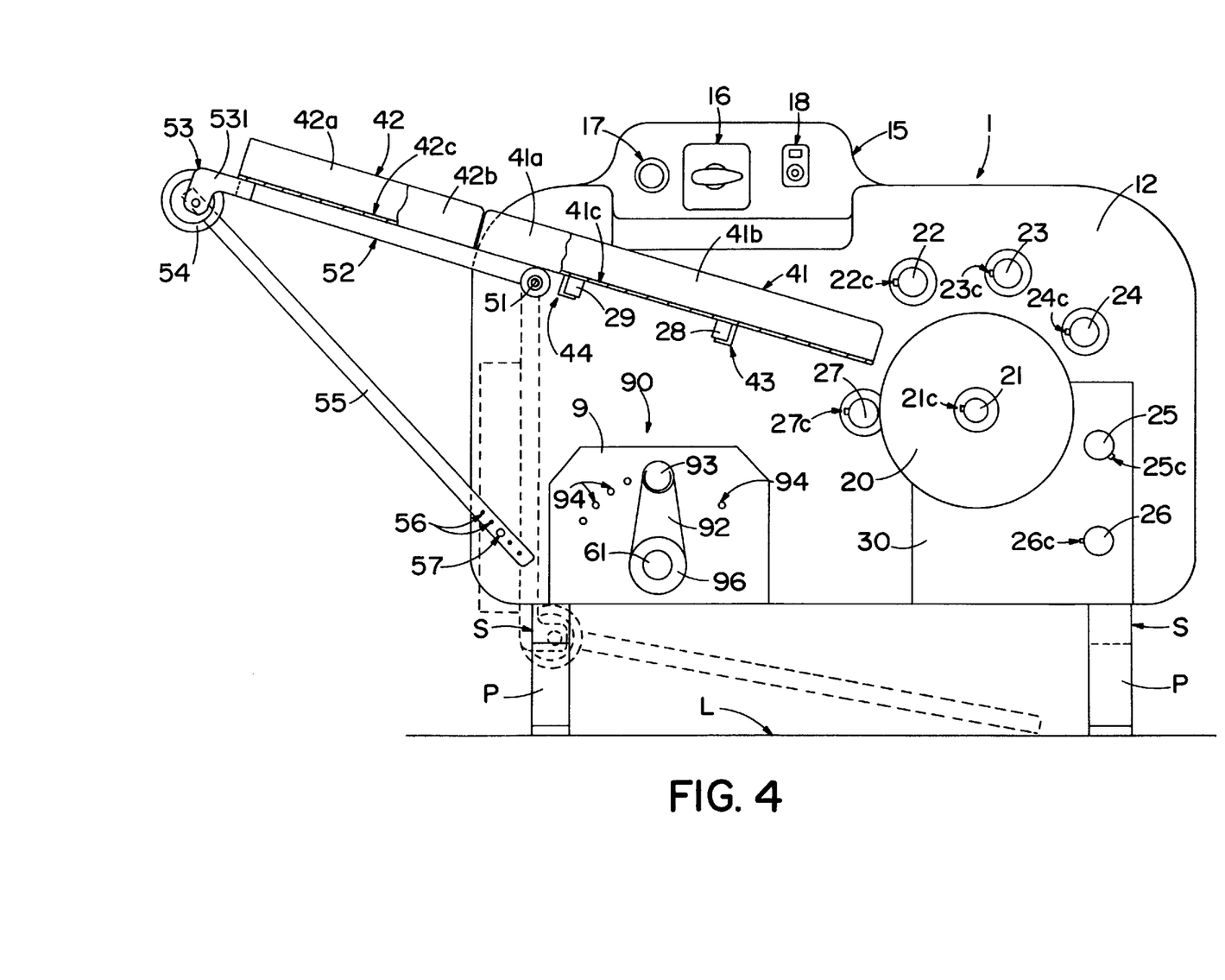
FIG. 4 is similar to FIG. 3, but shows an application of some guide parts for dough being processed.

As shown in FIG. 4, on the flat surface 12 of the housing 1, a disk 20 which has a central through hole is inserted on shaft 21. Also, a generally rectangular plate 30 is disposed in the proximity of the right side of the housing and is provided with through holes suitable for receiving shafts 25, 26. Also, the plate includes a cut out portion for receiving a circumferential edge of the disk 20. The disk 20 and plate 30 have a discrete thickness and define, as described below, the inside wall against which the dough impacts on its course during processing in the machine.

An inside part 41 of the feeder conduit 40 is mounted on the flat surface 12 of the housing. As shown in FIGS. 1–5, the inside part and an outside part 42 of the feeder conduit 41 are configured in a U-shape which is formed from a suitable plate of stainless steel. Each of the inside and outside parts has two lateral lips 41a, 41b and 42a, 42b, respectively. The lateral lips 41a, 41b and 42a, 42b are interconnected by transverse lines or plates 41c, 42c, respectively.

The inside part 41 of the feeder conduit 40 is arranged such than an outer end thereof is positioned so as to correspond with an upper end of the left side of the flat surface 12. The inside part is also inclined downwardly from the outer end and terminates in an inner end which is located adjacent disk 20 where it is fixed to the housing 1 between shafts 22 and 27. In the preferred form of an attachment to the housing, the support elements 28, 29 are inserted between opposing L-shaped elements 43, 44 which are secured to the lower outside surface of the transverse line 41c of the interior part 41.

Figure 5:
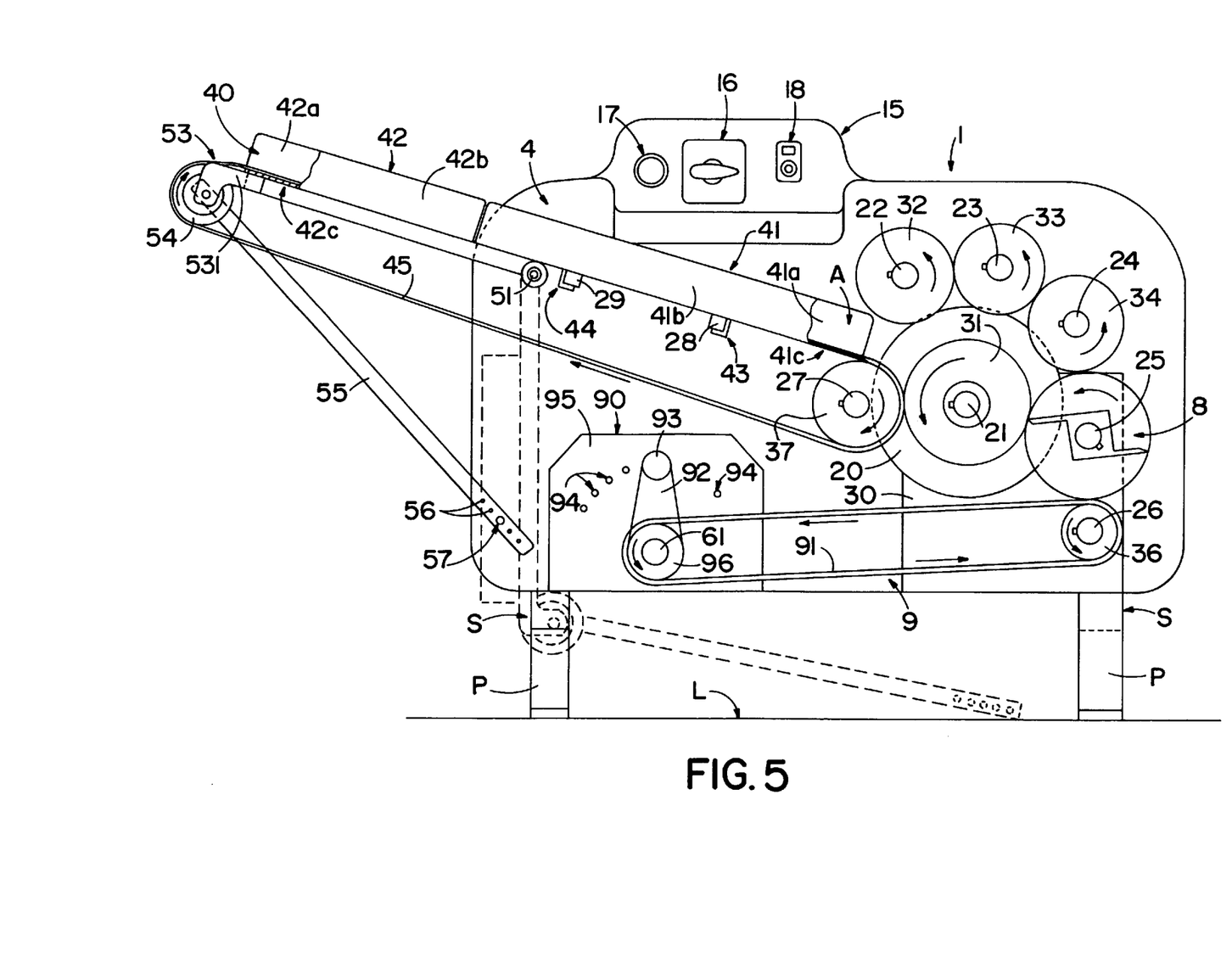
FIG. 5 is similar to FIG. 4, but shows the subsequent application of the remaining elements of feeding, rolling, cutting, and discharge of the dough.

As shown in FIG. 5, cylinders of rollers 31–34 are applied on shafts 21–24, respectively. The cylinders 31–34 have equal widths. The cylinder 31 has a diameter which is greater than that of the other three cylinders 32–34 which have equal diameters. In a practical construction, the diameter of the cylinder 31 is about 130 mm while the diameter of the cylinders 32–34 is about 100 mm. Each of the three cylinders 32–34 is arranged radially around the cylinder 31 at progressively decreasing distances from the latter. In a practical construction, the cylinder 32 is separated from cylinder 31 by about 30 mm while cylinder 34 is separated from cylinder 31 by about 20 mm. The above-mentioned cylinders are arranged so as to be mutually tangential relative to each other.

Figure 7:
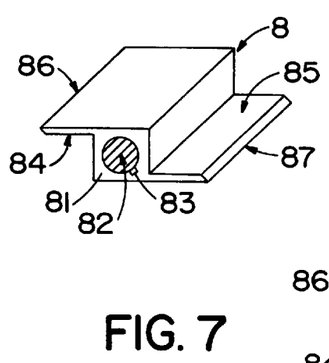
FIG. 7 shows in a perspective view of the particular conformation of a dough cutting and piecing device which is used in the apportioner of the present invention after rolling the dough.

The cutting device 8 is keyed on the shaft 25 as shown in FIGS. 1 and 5. Also, as illustrated in FIG. 7, a first embodiment of the cutting device 8 is formed with a central body 81 including a rectangular shaped element with a square cross section provided centrally with a hole 82. The hole 82 is equipped with a longitudinal groove 83 for insertion and keying of key 25c of shaft 20.

From the two opposite sides of the central body 81, there diverges two rectangular plates 84, 85 extending in opposite directions. The rectangular plates are equal in size and terminate in free ends 86, 87 which are suitably chamfered to form sharp corners equidistant from the axes of shaft 25. Upon rotation of the cutting device 8, the sharp corners contact the outside cylindrical surface of roller 31. The width of the plates 84, 85 in the first embodiment will be equal to that of the roller 31.

Figure 8:
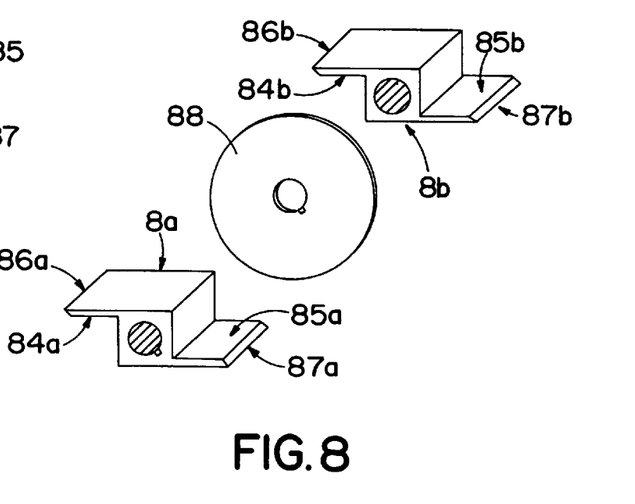
FIG. 8 shows a device, which is similar to the apparatus of FIG. 7, but is divided into two equal elements between which a discoidal element is disposed.

A second embodiment of the cutting device is shown in FIG. 8 and comprises two equal parts 8a, 8b, and a disk 88 interposed between the two parts 8a, 8b. The disk 88 has a diameter equal to that developed by the corners at the ends 86a, 87a of the plates 84a, 85a of the first part and the corners 86b, 87b of the plates 84b, 85b of the second part. The circumferential edge of the disc 88 also contacts the outside cylindrical surface of the roller 31.

The rollers 36, 37 are keyed on the shafts 26, 27, as in the preceding elements (31, 32, 33, 34, 8), to effect rotation of the conveyor belts 91, 45 of the discharge unit 9 and feeder unit 4, respectively. By turning the crank 92 so as to position the idler roller 96 toward the roller 36, it is possible to easily insert the conveyor belt 91 of discharge device 9 on rollers 96, 36. After the belt 91 is installed, the crank is turned in the opposite direction so that the idler roller 96 is pushed away from the roller 36 to tighten the conveyor belt 91, and once the desired tension is reached, the corresponding position of the crank 92 is fixed by causing a fixing pin of the knob 93 to be inserted into a suitable hole 94 of the plate 90.

To install the conveyor belt 45 of the feeding unit 4, the arm 52, bearing the outside part 42 of the feeder conduit 40 and the idler roller 54, is rotated about hinge pin 51 to a vertical position shown by dashed lines in FIGS. 1, 3, 4, and 5. In this position it becomes easy to insert both sections of the conduit formed by the U-shaped elements forming the inside part 41 and the outside part 42 of the feeder conduit 40 of the loading unit 4, as well as to position the conveyor belt on the idler roller 54 and the roller 37. The arm 52 will then be rotated outwardly of the feeder unit 4 until the inside part 41 and outside part 42 forming the feeder conduit 40 are effectively aligned. In the aligned position, the conveyor belt 45 will be tightly disposed between the rollers 37, 54. The feeder unit 4 is then fixed in position by inserting a suitable peg 57, or other equivalent means, in one of the through holes 56 of regulating or adjustment shaft 55 and into a corresponding hole formed in the flat surface 12 of housing 1 in the proximity of the lower left corner.

By providing a plurality of holes 56 in the adjustment rod 55, it is possible to discretely vary the position of the outside part 42 of the loading unit 4, and therefore, the position of the idler roller 54 can be varied in order to regulate the tension of the conveyor belt 45.

At this point all of the elements necessary for processing have been installed. To secure the elements in place, i.e. the rolling rollers 31, 32, 33, and 34, the cutting device 8 as well as the roller 37 provided for actuating the conveyor belt 45, it will only be necessary, as clearly evident in FIG. 6, to apply a first disk 60 on a hinge pin 22 which projects coaxially from the outside end of shaft 21. The first disk 60 is preferably formed of a transparent plastic material and has a diameter which is suitable for covering, at least partially, all of the free ends of shafts 22, 23, 24, 25, and 27. A second disk 70 having a central through hole and a diameter which is smaller than the diameter of the first disk 60. The second disk 70 is formed of a suitable metal material. To install the disks 60 and 70 it is necessary to simply insert them by means of their respective central holes, on the hinge pin 22. The disks are then secured by the clamping action created by screwing down of a threaded knob 35 on a threaded section 23 formed on the end of the hinge pin 22.

The rollers 36, 96 of the discharge unit 9 are attached on the respective shafts 26 and 61 with suitable means which clearly may be of various types which are already known and therefore are not illustrated or described.

The apportioning apparatus described up to this point is effectively complete and ready for use. However, the apparatus may be designed for the application of a suitable protective covering preferably made of transparent plastic material suitable for covering and isolating the feeding, cutting, and discharge units from the outside. The protective covering also affords a considerable degree of hygiene in use, as well as safety for the operator.

Figure 6:
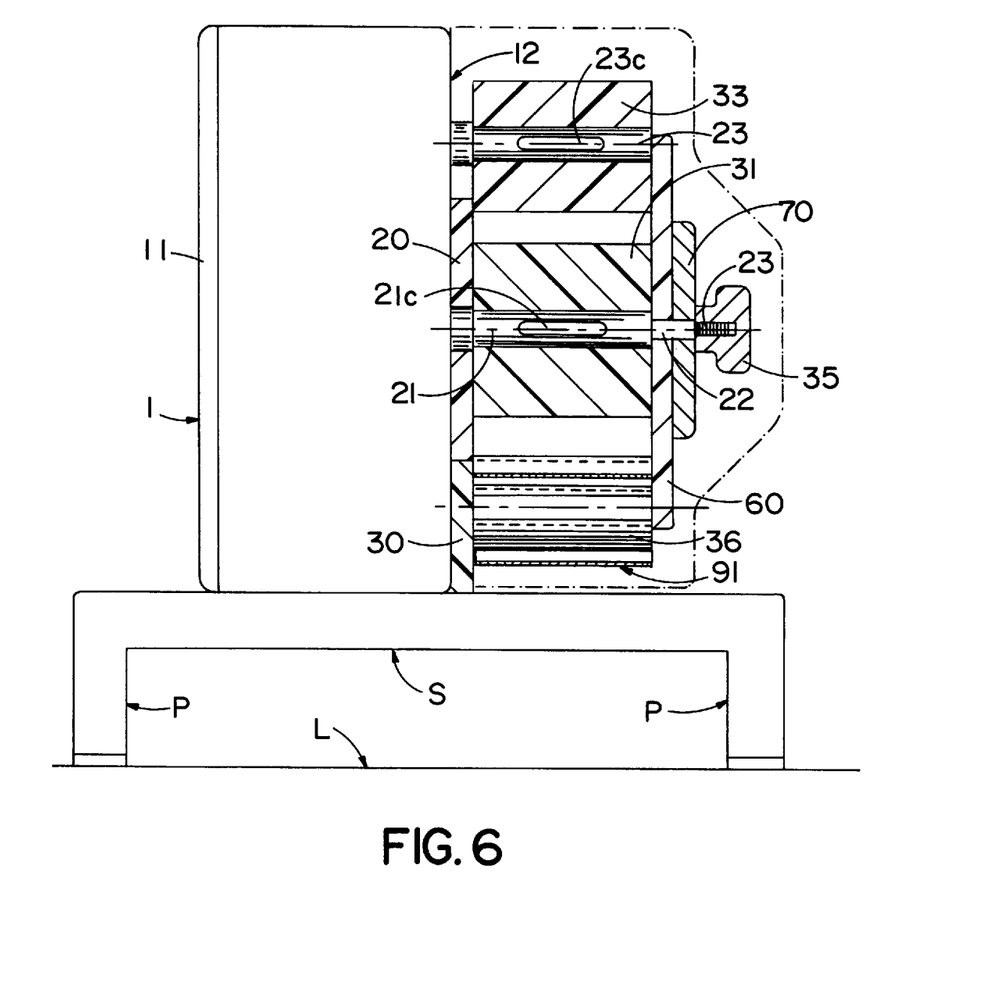
FIG. 6 is a cross sectional view taken along line I—I of FIG. 1 relative to the sole processing part.

The protective covering is clearly indicated by the dashed and dotted lines in FIGS. 1, 2, and 6 and it may be attached to the housing 1 by various means and systems which therefore are neither illustrated or explained.

For safety, a microswitch or other suitable means for detecting whether the covering is applied can also be provided to prevent operation of the machine in the event that the cover is not applied. To complete the description of the apparatus, it is noted that the control panel of the machine is hollowed out on the front surface of the projecting part 15. Provided at this location are the general switch center 16, a safety button 17 and the varistor or speed varying device 18 for controlling the rotational speed of the motor. The motor is provided for actuating the cutting device 8. Further, there will be described below in summary fashion the means of actuating the apparatus as well as the related gearing which is provided in the housing 1, and its interconnection to the related conveying, rolling, and cutting devices.

In practice, in the housing 1 there will be arranged two electric motor reduction units, in particular, a first motor reduction unit with a fixed and constant rotational speed for actuating, through the shafts 26, 37, the conveyor belts 45, 91 of the respective loading and discharge units 4, 9 as well as rollers 31–34 of the rolling unit, and a second motor reduction unit with variable rotational speed for the actuation of the cutting device 8.

The first motor reduction unit will be connected with various suitable means of transmission such as pinion gears, transmission belts and/or drive chains, to shafts 21, 22, 23, 24, 26, and 27 so as to impart a counter clockwise rotation to shafts 22, 23, 24, 26 and therefore to the respective rollers 32, 33, 34, 36 and, on the other hand, a clockwise rotation to the shafts 21 and 27 and therefore to the respective rollers 31 and 37.

The transmission ratios will be such as to impart, to the roller 37, a rotational speed suitable for developing a limited conveyer speed on the conveyor belt 45, respective rotational velocities developed in relation to the similar peripheral diameters of the rollers 31–34, and finally a rotational velocity on the roller 36 to develop a rotational speed of the conveyor belt 91 which is considerably greater than the loading and rolling speed.

The shaft 25, on which is mounted the cutting device 8 which is on the other hand connected as mentioned above to the second motor reduction unit with variable speed, will be rotated in a counter clockwise direction with a rotational speed which may vary from zero to a maximum of around 30 revolutions per minute.

During a processing operation, the cutting speed, i.e. the peripheral speed of the sharp corners at the free ends 86, 87 of the rectangular plates 84, 85 of the cutting device 8, will be regulated so as to produce dough pieces of desired weights and sizes while at the same time avoiding the disadvantages in their subsequent removal, when the various pieces thus produced run through the discharging conveyor 91.

Figure 9:
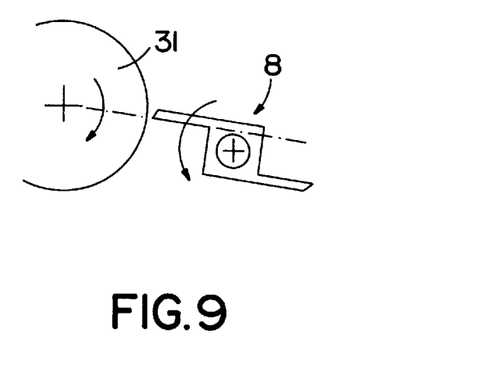
FIGS. 9 and 10 schematically representations of two possible applications of the cutting and piecing elements illustrated in FIGS. 6 and 7.
Figure 10:
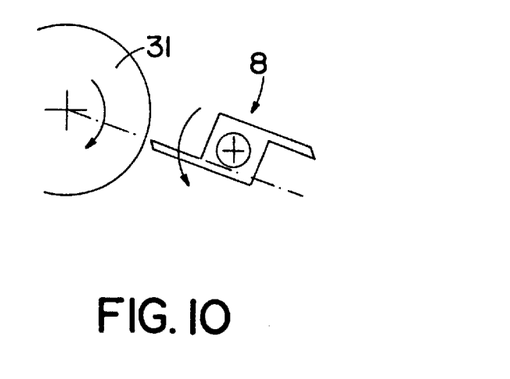

It is noted that on the basis of tests conducted for the production of dough portions produced by the cutting device 8 having a limited weight, i.e. up to about 100 grams, the cutting device 8 will be preferably used as illustrated in FIG. 10, while for portions having a greater weight, the cutting device 8 will be used to obtain a better operation in an upside down mode as illustrated in FIG. 9. Also, the use of a cutting device 8 of the type illustrated in FIG. 7 produces two pieces of dough with each revolution of the device, while the equivalent use of the double device, illustrated in FIG. 8, produces four pieces of dough with each revolution of the device.

In conclusion, it is noted that obviously all of the elements of the machine which during the processing come into contact with the dough will be made of suitable material which can prevent any and every kind of contamination. Having completed the detailed description of the distributing machine in question, the operation thereof will be summarily described.

An operator actuates master switch 16 to supply electrical power to the machine, thus putting into operation either the motor reduction unit with a variable rotational speed which puts into rotation the shaft 25 and therefore the cutting device 8, or the motor reduction unit with fixed rotational speed which puts into rotation the respective shafts 21, 22, 23, 24, 26, and 27 and therefore the rollers 31, 32, 33, 34, 36, and 37. Obviously the rollers 36, 37 will cause movement of the respective conveyor belts 91 and 45. For clarity, in FIGS. 1 and 5, the direction of rotation of the various rollers 31, 32, 33, 34, and 37 of the cutting device 8 as well as the rollers 54 and 96 and the conveyor direction of the conveyor belts 45 and 91 are shown by the respective arrows.

At this point the machine is in operation and ready for use. The operator then adjusts the rotational speed of the cutting device 8 to obtain the desired piece size through the varistor or speed varying device 18. Then the operator removes, from a mass of dough produced in a traditional way with manual operation or preferably through mechanical kneading carried out with a suitable kneading machine, pieces of dough of around three to five kilograms each and processes them manually to produce long pieces having a transverse dimension of about one decimeter and a length of around seven decimeters. The operator then takes one of the long pieces thus prepared and inserts it into the feeder conduit 40 depositing it onto the corresponding section of the conveyor belt 45 running along the bottom of the latter. The strip thus deposited is then dragged by the conveying motion of the conveyor belt 45 on which it rests and penetrates through an opening A formed in the protective covering (see FIG. 1) and into an intermediate space between the rollers 31, 32 where it begins to undergo the process of rolling. The dough strip then reaches the rollers 31, 32, and the rotation of rollers 31, 32 advances the strip making it progressively go through the successive intermediate spaces between the roller 31 and the corresponding successive rollers 33 and 34 which are disposed at progressively decreasing distances thus causing a corresponding progressive flattening of the strip which at the same time generates a progressive resultant transverse widening with the sides of the dough strip coming up against the surface of the disks 20 and 60 which effectively limit transversely the course of the rolling, i.e. the width of the intermediate space between the roller 31 and the rollers 32, 33, 34. The dough strip will thus be transformed into a flat strip with a rectangular cross section and will continue advancing in a return direction effectively in a downward vertical direction as the strip passes through the cutting device 8 which slices the strip while dragging it so as to generate portions which are deposited on the upper course of the conveyor belt 91 which moves the portions to the outlet, i.e. effectively to the roller 96 where it is removed from the conveyor belt 91 and falls downward through an outlet opening B formed in the protective covering.

The generation of the portions formed by the cutting device 8 occurs in the next mode. The rectangular plates 84, 85 of the cutting device 8, which are put into rotation as described above, rotate with a speed such that the respective sharp corners at free end 86, 87 rotate with a peripheral speed which is greater than the advancement speed of the dough strip from the preceding rolling train such that the latter falls first against a respective part of the dough strip penetrating thereafter progressively in it until adhering completely against the outside cylindrical surface of the roller 31 causing thereby a corresponding cut of the dough strip and the succession of cuts so produced generates a corresponding succession of portions of the strip. By increasing or reducing the speed of rotation of the cutting device 8, it is possible to obtain portions of lesser or greater length and therefore of lesser or greater weight.

As previously described, the cutting device 8 illustrated in FIG. 7 or the equivalent doubled device illustrated in FIG. 8 may be employed in the apportioning apparatus of the present invention.

In the first case as already explained, with each revolution of the cutting device, two portions are generated while in the second case four portions are generated.

With the construction and the dimensions of the machine described it is possible to obtain dough portions of dimensions and therefore of weight which are variable from a minimum of about 20 grams up to a maximum of about 400 grams.

It is noted finally that based on tests and checks conducted on a prototype of the machine in question for the generation of limited weight portions, i.e. effectively up to about 100 grams, it is preferable to mount the cutting device 8 as illustrated in FIG. 10, while for the generation of portions of greater weight it is better to mount the cutting device upside down as illustrated in FIG. 9.

The arrangement and operation of the various elements and devices of the machine of the present invention which come into contact with the dough being processed, and their assembly are now clearly described. Clearly the corresponding disassembly will be seen to be simply a reversal of the operations of assembly as described above.

It will be noted finally that as already mentioned and as clearly discernible from FIGS. 1 and 5, the rollers 32–34 are tangent to each other and also the conveyor belt 43 in the winding section of the roller 37 is tangent to the roller 31. This makes it so that in the points of tangency of the elements which come between them in mutual contact, their being a respective resultant opposite rotational movement between them, automatically and continuously causes the removal of any and every particle which may remain stuck either on the rollers 31–34 or on the conveyor belt 45 thereby obtaining perfect and constant cleaning of the same.

In conclusion, based on what has been explained above and described in detail, the advantageous features of the machine which achieve the object of the present invention are evident.

In the first place, in similar known machines in which all of the processing organs which come into contact with the dough and are normally arranged between two lateral housings for which reason they are effectively inaccessible, consequently preventing the performance of a complete cleaning with consequent hygiene disadvantages and moreover, in the event their disassembly and subsequent reassembly are necessary, the known device requires disassembling and reassembling effectively the entire machine which, besides being especially complex and difficult, requires the use of qualified personnel and very substantial down time with consequent relatively high costs. In contrast, in the apportioning apparatus of the present invention, all of the subunits for processing the dough are arranged on one single side of the housing and are very easily disassembled and reassembled in a very simple and especially quick way without requiring the services of qualified personnel. Each device or element can thereby be easily and quickly cleaned and even the whole flat surface 12 of the housing 1 can be easily and quickly cleaned. Moreover, the cleaning of a substantial part of the elements which during the processing come into contact with the dough and precisely as described, with the rollers 32, 33, 34, as well as the roller 31 and related conveyor belt 45, is carried out automatically and continuously, which permits the advantageous operational effect of avoiding the necessity of providing scraper knives, which are complex and also costly, to obtain the same result. It is therefore clear how the apportioning apparatus of the present invention affords a degree of hygiene which is not obtainable in traditional machines.

A further advantage of the present invention is the refolding ability of the outside section of the loading unit 4 which permits a substantial reduction of the overall size of the machine which is especially useful during transport of the machine.

The protective covering effectively covers all of the organs for processing the dough, as well as prevents any possible introduction of substances, elements, or particles of various types which could contaminate the product being processed. The covering is also an important safety device as it obviously prevents accidental introduction of hands or other parts of the body of the operator during operation of the apparatus.

It is understood that different variants may be introduced to the machine in question without thereby going outside of the scope of what was described and subsequently claimed with reference to the enclosed drawings and therefore the domain of the protection of the present patent.

I claim:

1. An apportioner for dough, said apportioner comprising:
   a housing having a generally rectangular shape with a front side surface;
   a feeder unit for feeding long strips of dough, said feeder unit comprising a rotatable shaft projecting from said front side surface of said housing, a roller mounted on said rotatable shaft, an idler roller, and an endless conveyor belt mounted on said roller and said idler roller;
   a rolling unit disposed adjacent a discharge end of said feeder unit and including a plurality of rollers forming a rolling train for rolling the dough strips, said rolling train having an outlet end, a plurality of shafts projecting from said front side surface of said housing, and a plurality of rollers mounted on said plurality of shafts, respectively;

a cutting device, following said rolling train, for transversely cutting the dough rolled by said rolling train so as to form discrete dough portions, said cutting device including a rotatable shaft projecting from said front side surface of said housing, and a cutting element mounted on said rotatable shaft; and a discharge unit for receiving the dough portions from said cutting device and conveying the portions to an apportioner outlet, said discharge unit including an idler roller mounted on said front side surface of said housing, a rotatable shaft projecting from said front side surface of said housing, a roller mounted on said shaft, and a conveyor belt mounted on said idler roller and said roller.

2. The apportioner as claimed in claim 1, wherein said rollers of said rolling unit define a central roller and a group of rollers radially spaced from a central axis of said central roller in progressively decreasing distances, said group of rollers being disposed so as to be tangent to an adjacent one of said group of rollers.

3. The apportioner as claimed in claim 2, wherein:

one of said rollers of said group of rollers is spaced a distance from said roller of said feeder unit so as to form an entrance opening of said rolling train;

said conveyor belt, which runs over said roller of said feeder unit, is tangent to a cylindrical surface of said central roller; and rotation of said group of rollers, said central roller, and said conveyor belt of said feeder unit effects continuous removal of sticking dough particles.

4. The apportioner as claimed in claim 2, further comprising:

at least one disk attachable coaxially on said shaft supporting said central roller;

a knob provided on an outer end of said shaft supporting said central roller so as to clamp said shaft supporting said central roller through said disk, wherein said disk has a diameter which is sufficient to cover at least a portion of said shafts supporting said group of rollers, said shaft supporting said cutting device, and said shaft of said feeder unit.

5. The apportioner as claimed in claim 4, wherein said disk and knob comprise the sole means of securing said roller of said feeder unit, said rollers of said rolling unit, and said cutting device on said front side surface of said housing.

6. The apportioner as claimed in claim 1 wherein said conveyor belt of said discharge device is controlled to run at a speed which is greater with respect to a rolling speed of said rolling train as well as a successive cutting speed impressed on the rolled dough by said cutting device in order to always obtain secure removal of the portions generated by said cutting device.

7. The apportioner as claimed in claim 1, wherein said housing defines a control panel projecting upwardly from a top surface of said housing.

8. The apportioner as claimed in claim 1, wherein said housing includes a rear cover which is removable to permit access to the interior of said housing, said rear cover being disposed on an opposite side of said housing relative to said planar front side surface.

9. The apportioner as claimed in claim 1, wherein said feeder unit comprises a plurality of support elements projecting from said planar front side surface of said housing, a feeder conduit including an inside part supported on said support elements and an outside part, wherein said idler roller is mounted on an outer end of said outside part, and said outside part is pivotally mounted on said planar front surface by a hinge so as to be movable between a substantially vertical position and a position substantially in alignment with said inside part.

10. The apportioner as claimed in claim 9, further comprising an adjustment rod having a first end adjustably supported on said planar front side surface of said housing, and a second end connected to said idler roller of said feeder unit.

11. The apportioner as claimed in claim 1, wherein said roller of said feeder unit is adjustably supported by an adjustment dispensing device comprises an eccentric hinge pin mounted on said planar front side surface of said housing, said idler roller being mounted on said eccentric hinge pin, and said eccentric hinge pin adjustably supporting said conveyor belt.

12. The apportioner as claimed in claim 1, further comprising a transparent plastic cover attached to said planar front side surface of said housing for covering said roller of said feeder unit, said rolling unit, said cutting device and said dispensing device.

* * * * *